Jan. 29, 1963  A. M. RICHARDS  3,075,515
BLOOD FLOW METER
Filed Oct. 17, 1958  2 Sheets-Sheet 1

INVENTOR
Albert MacDonell Richards
BY Robert M. Dunning
ATTORNEY

Jan. 29, 1963 A. M. RICHARDS 3,075,515
BLOOD FLOW METER
Filed Oct. 17, 1958 2 Sheets-Sheet 2

INVENTOR
Albert MacDonell Richards
BY
ATTORNEY

United States Patent Office 3,075,515
Patented Jan. 29, 1963

3,075,515
BLOOD FLOW METER
Albert M. Richards, 5 Crocus Place, St. Paul, Minn.
Filed Oct. 17, 1958, Ser. No. 767,829
5 Claims. (Cl. 128—2.05)

This invention relates to an improvement in blood flow meters and deals particularly with an apparatus capable of measuring the flow of blood in the human body.

For many years an apparatus for measuring the flow of blood in the peripheral arteries and veins has been desired. Although blood pressures have been intensively studied, there is yet no precise knowledge of blood flow in the heart and blood vessels of man. Accordingly, a velocity probe capable of measuring the flow of blood will provide intelligence which will allow tremendous advance in the study of heart disease and in so doing, be of inestimable practical importance to mankind. It is the object of the present invention to provide such a velocity probe.

A velocity probe of the type to be described will allow certain lines of investigation, some of which are as follows:

(1) The assessment of heart-valve function and competency prior to surgery. For example, the operation "mitral commisurotomy" has been designed to open the narrowed mitral valve of patients having rheumatic valvular heart disease as a consequence of rheumatic fever. If this valve is incompetent and there is a considerable reflux of blood through the valve, surgery will not be successful and in fact be hazardous. In some cases, existing clinical means of evaluation are not adequate to determine the presence or degree of insufficiency of the valve before operation. In a few unfortunate cases, surgery itself has produced incompetence of the valve and this again cannot be completely evaluated clinically, but must wait upon examination at the autopsy table.

(2) Congenital heart defects are often extremely complex and varied. New surgical techniques now allow attack of specific defects. This requires precise diagnosis preoperatively. In certain instances, for example atrial or ventricular spetal defects, holes in the walls of the heart chambers allow abnormal flow from high pressure to low pressure areas. These flows, or so called shunts, have been grossly approximated by rather cumbersome techniques in the past, but a velocity probe will allow a much finer quantitation.

(3) Lacking flow information, the total mechanical energy expenditure per heart beat has never been quantitated in man. By determining instantaneous pressure and flow, the total mechanical energy expenditure may be determined, the efficiency of the heart muscle defined, and the response to various stimuli studied. Such intelligence opens the door to the precise study of the cause of the heart failure and its treatment. Although this field has been studied for centuries, it has not yet been explored in man because of the lack of flow information.

(4) The flow pattern of blood in the elastic peripheral arteries and veins has never been explored in man. Instrumentation to effect this immediately opens countless practical applications. For example, at certain times during surgery upon blood vessels, flow information would be priceless. The use of multiple probes would make possible estimation of the percentage of the cardiac output utilized by the different organs. A study of the peripheral pressures, flow and resistances in the various vascular beds could contribute greatly to our understanding of high blood pressure.

A feature of the present invention resides in the provision of a velocity probe mounted on the end of a catheter which may be inserted into the arteries of the human body to measure velocity flow. The probe includes a pair of longitudinally spaced temperature sensitive resistances which are wound in coils on the exterior surface of the probe. Positioned between the resistances, and equally spaced therefrom is a third coil which serves as a heater for slightly elevating the temperature of the blood. Variations in temperature of the blood caused by the energization of the heating coil is sensed by the resistance coils, acting to unbalance a Wheatstone bridge circuit in which the resistance coils are connected. As a result, the variations in temperature are picked up by a detector, are amplified, and are recorded on a recording device such as the Sandborn type of recorder common in medical practice.

It has been found that when a constant electrical power is dissipated in a heating coil located between a pair of temperature sensitive resistances, the temperature difference between the resistances varies inversely with the flow velocity. Thus, by dissipating a small amount of heat at a point intermediate a pair of temperature sensitive resistances, and by recording the heat differential in the two resistances, the flow velocity and flow direction may be accurately determined.

When an instrument is produced for measuring flow velocity in the arteries of a human body or the like, the probe or sensor must be extremely small in size and must occupy a volume of ⅛ inch in diameter and ¾ of an inch in length or smaller. The sensor is mounted on the end of a catheter tube for insertion into the major arteries or veins as well as major cavities of the blood system. In order to produce the desired results, it is desirable that the sensor register forward and reverse flows of fluid up to 200 centimeters per second with minimum to maximum flow rates occurring in 0.1 of a second. Tests have shown that the present device is capable of accomplishing these results.

These and other objects and novel features of the present invention will be more clearly and fully set forth in the following specification and claims.

In the drawings forming a part of the specification:

Figure 3:
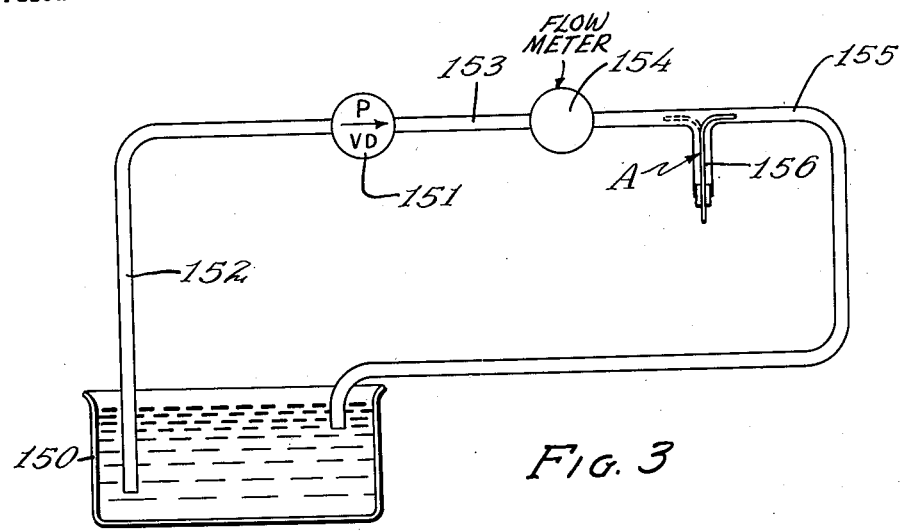
FIGURE 3 illustrates diagrammatically the test apparatus with which the flow meter was originally tested.

The fluid flow meter or probe is indicated in general by the letter A and in the particular arrangement disclosed consists of a tube 10 of nylon or similar material which in the original form was ⅛ inch in outside diameter and had an inside diameter of 1/16 of an inch. Tubes of somewhat smaller outside diameter may be effectively used and are preferable from the standpoint of ease of insertion into the arteries and veins. Preferably, the tube 10 is provided with a tapered forward end 11 terminating in a rounded extremity 12.

A Balco resistance wire which is sensitive to variations in temperature is wound about the surface of the tube 10 as indicated at 13. Preferably, the wire is flattened to a thickness of perhaps 0.0002 of an inch and a width of 0.004 of an inch to increase the frequency response. In the particular arrangement illustrated the coil 13 is approximately 0.02 of an inch in length and consists of five turns of resistance wire. A second resistance coil 14, similar to the first coil, is wound about the tube in longitudinally spaced relation from said first coil. The coil 14 is made using wire similar to that used for the coil 13, of similar length, sensitivity, and thickness, coil 14 being composed of five turns of the wire.

A heater coil 15 is wound about the tube at a point centrally between the ends of the coils 13 and 14. The coil 15, in the arrangement illustrated, is made of manganin resistance wire which is flattened to approximately the same thickness and width as the wire used for the coils 13 and 14. The heater coil 15 is approximately 0.013 of an inch in length and comprises three turns of the wire.

The ends of the wires are inserted through the wall of the tube to provide leads or connections with the coils. If desired, the inner ends of the resistance coils 13 and 14 may be connected to a single lead leading through the tubular body.

A sleeve 16 of slightly greater diameter than the tube 10 is secured in telescoping relation to the end of the tube and projects beyond the tube 10 to provide a socket 17 for accommodation of the end of a catheter tube 19. The wire leads from the three resistance coils extend through the catheter for connection with the current supply.

Figure 2:
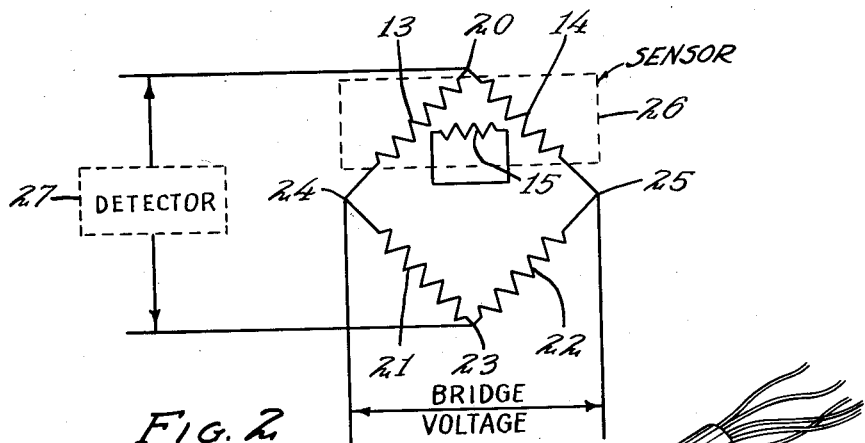
FIGURE 2 is a diagrammatic view showing the broad system employed to measure fluid flow.
Figure 1:
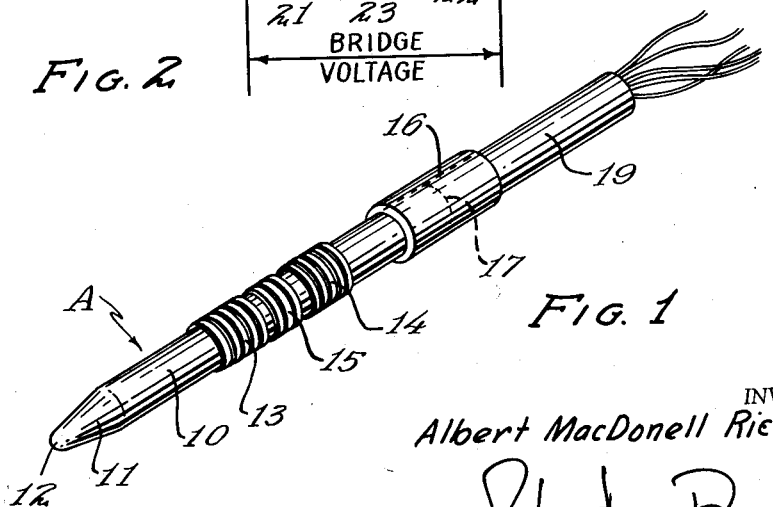
FIGURE 1 is a perspective view of a probe mounted on the end of a catheter, showing the general arrangement of parts.

FIGURE 2 of the drawings indicates diagrammatically the sensor components in the electrical circuit. The identical resistance coils 13 and 14 are connected at 20 to provide two sides of a Wheatstone bridge circuit. Balancing resistances 21 and 22 are connected at 23 to provide the opposite sides of the Wheatstone bridge circuit. Resistances 13 and 21 are connected at 24 and resistances 14 and 22 are connected at 25. Bridge voltage current is supplied to the points 24 and 25 of the Wheatstone bridge circuit. The heating coil 15 is diagrammatically illustrated between the coils 13 and 14. The coils 13, 14 and 15 comprise the sensor which is shown enclosed within the area defined by a broken line 26. A detecting device is shown enclosed by the broken line 27, the device being connected between the points 20 and 23 of the Wheatstone bridge circuit to indicate a temperature change in one or both of the coils 13 and 14.

Figure 4:
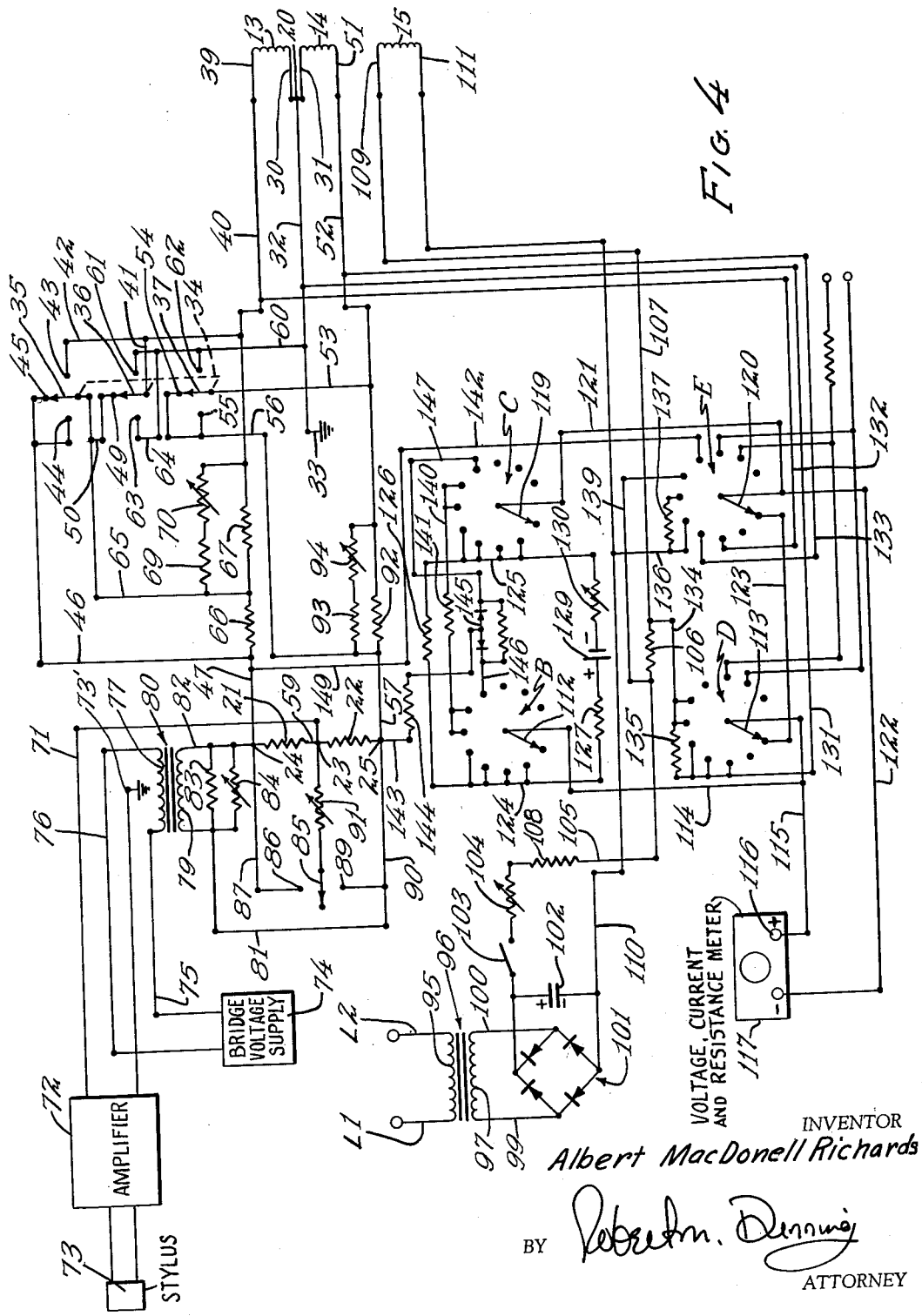
FIGURE 4 is a diagrammatic view showing the apparatus which is employed in conjunction with an amplifier and recording apparatus commonly known as a Sandborn type recorder.

In actual practice, the device indicated diagrammatically in FIGURE 4 of the drawings form the detector and is connected between the sensor and an amplifier which in turn is connected to a stylus or other recording device. A current supply is provided and is connected to the apparatus to supply bridge voltage.

Due to the fact that the apparatus illustrated in FIGURE 4 may be connected directly to a Sandborn type amplifying and recording device, these structures are not illustrated or described in detail. In the particular arrangement illustrated, the leads from the coils 13, 14 and 15 are connected to conductors leading to the resistances 21 and 22. The leads 30 and 31 of the coils 13 and 14 are connected by a common conductor 32 to a ground terminal 33.

A three gang switch indicated in general by the broken line 34 has its rotatable arms 35, 36 and 37 selectively rotatable into three different positions. The second lead from the coil 13 is indicated at 39 and is connected by the conductors 40 and 41 to the arm 36 of the switch 34 and is connected by the conductors 40 and 42 to a terminal 43 of the gang switch 34. The remaining terminals 44 and 45 engageable with the uppermost switch arm 35 are interconnected. Terminals 44 and 45 are connected by conductor 46 and conductor 47 to one terminal of the resistance 21. The center terminal 49 of the intermediate switch arm 36 is connected by a conductor 50 to the switch arm 35. Thus, when the switch arms 35 and 36 are in the position illustrated, a circuit is provided from one terminal of the resistance coil 13 to ground and from the other terminal of the coil 13 through conductors 39, 40, 41, the switch arm 36, conductor 50, switch arm 35, terminal 45, and conductors 46 and 47 to one terminal of the fixed resistance 21 forming a direct connection between the ends of coils 13 and 21 as illustrated at 24 in FIGURE 2. The other terminal of coil 14 has its lead 51 connected to conductor 52 which is connected to conductor 53 leading to the switch arm 37 of the lower section of the switch 34. The central terminal 54 and one side terminal 55 of the switch arm 37 are interconnected and are connected by a conductor 56 to a conductor 57 leading to one terminal of the fixed resistance coil 22. Thus, when the switch 34 is in the position illustrated in the drawings, there is a direct connection between the terminal of the coil 14 through the switch arm 37 to the fixed resistance coil 22, this connection being represented by the numeral 25 in FIGURE 2 of the drawings. The resistances 21 and 22 are connected together by the conductor 59 forming the terminal 23 illustrated in FIGURE 2.

A conductor 60 leads from the ground 33 to switch terminal 61 of the intermediate switch portion and terminal 62 of the lower switch portion. The third terminal 63 of the intermediate switch section is connected by conductor 64 to conductor 60 leading to ground 33.

Switch arm 35 of the uppermost switch section is connected by conductors 50 and 65 to one terminal of a resistance 66, the other terminal of which is connected to the conductor 47 leading to the resistance 21. The resistance 67 is connected between the conductor 65 and the conductor 40 leading to one terminal of the coil 13. A resistance 69 and a variable resistance 70 are connected in series and are arranged in shunt relation to the resistance 67.

The output signal is connected to the conductor 59 and includes a conductor 71 illustrated diagrammatically as extending to the amplifier 72. The connection between the coils 13 and 14 is grounded as indicated at 33 and the amplifying circuit of the output signal is completed by the ground conductor 73'. The amplifier 72 may be of the Sandborn type which directs the amplifying signal to a stylus 73 or other indicating apparatus for recording the amplitude of the signal.

The bridge voltage supply 74 is connected by conductors 75 and 76 to the ends of a transformer coil 77. The other coil 79 of the transformer 80 has one terminal connected by a conductor 81 to the conductor 57 and the resistance coil 22. The other terminal of the transformer coil 79 is connected by conductor 82 to the opposite side of the fixed resistance 21. A fixed resistance 83 and variable resistance 84 are connected in series between these conductors.

A toggle switch arm 85 which is normally open is selectively engageable with a terminal 86 connected by conductor 87 to the resistance 21 and is also selectively engageable with a terminal 89 connected by conductor 90 to the opposite side of the resistance 22. A variable resistor 91 is connected between the toggle switch arm 85 and the conductor 59 between the resistances 21 and 22 as indicated. The resistance 91 is normally high relative to the fixed resistances 21 and 22 and provides a means of properly balancing these resistances.

A resistance 92 is connected between the conductor 57 and the conductor 52 leading to the outer terminal of the coil 14. A fixed resistance 93 and a variable resistance 94 are arranged in shunt relation with the resistance 92 for a purpose which will be later described.

Line wires L1 and L2 are connected to opposite ends of a transformer coil 95 of the voltage reducing transformer 96. The cooperable transformer coil 97 is connected by conductors 99 and 100 to opposite sides of a selenium rectifier bridge 101. The output terminals of the rectifier bridge are connected to opposite terminals of a condenser 102. One terminal is connected through a switch 103, and a variable resistor 104 and the fixed resistance 108 to a conductor 105 leading through a resistor 106 and conductor 107 to one lead 109 of the heater coil 15. The other output terminal of the rectifier 101 is connected by conductor 110 directly to the second lead 111 of the heater coil. Thus, when the switch 103 is closed, direct current is transmitted to the heater coil sufficient to heat the fluid passing the heating coil. In practice, the amount to which the blood is heated may be a fraction of a degree Fahrenheit.

An indicating and calibrating device is incorporated in the circuit between the junction of the coils 13 and 21 and the coils 14 and 22. This device includes a four gang rotary switch having ten or more poistions. These switches are indicated in general by the letters B, C, D and E. The arms 112 and 113 of the switches B and D are connected by conductors 114 and 115 to the positive terminal 116 of the type useful in measuring voltage, current, and resistance. The arms 119 and 120 of the switches C and E are connected by conductors 121 and 122 to the negative terminal of the meter 117. The switches are shown in a first position and a conductor 123 is shown connecting the first terminal of the switches D and E. When in this first position, the meter is turned off.

The second, third, fourth, and fifth positions of switch B (in a clockwise direction) are connected by a conductor 124 and the second, third, fourth and fifth positions of switch C are likewise connected by a conductor 125. A fixed resistance 126 is positioned between one end of the conductor 124 and a corresponding end of the conductor 125. A fixed resistance 127, a battery 129, and a variable resistor 130 are provided between the other ends of the conductors 124 and 125. The second terminals of the switches D and E are blank. Accordingly, when the switches are turned to the second position, a zero reading on the meter 117 may be obtained by adjustment of the variable resistor 130.

The third and fourth positions of switch D are connected by a common conductor 131 to the conductor 32 leading to the common terminal of the coils 13 and 14. Terminal 3 of switch E is connected by conductor 132 to the conductor 40 leading to the lead 39 of coil 13. Thus, when the meter is in third position, the meter is connected to opposite ends of the resistance coil 13 and the resistance of this coil may be measured. The fourth position of switch E is connected by conductor 133 to the conductor 52 leading to the lead 51 of the coil 14. Thus, when the switches are in their fourth position, the resistance of the coil 14 will be read upon the meter 117.

The heater wire conductor 107 is connected by conductor 134 to the sixth and seventh terminals of switch D and through a resistance 135 to the fifth terminal of switch D. Conductor 110 is connected by conductor 136 to the fifth terminal of switch E and through resistance 137 to the sixth terminal of switch E. Conductor 105 is connected by conductor 139 to the seventh terminal of switch D.

The sixth and seventh terminals of switch B and C are connected together through conductor 140 and the fixed resistance 141. Thus, when the switch is in the fifth position, the resistance of the heater coil may be measured by the meter. When the switch is in sixth position, the heater voltage may be measured. When in seventh position, the heater current may be measured.

The eighth terminal of the switch portion E is connected by a conductor 142 and conductor 149 to the conductor 47 leading to the outer end of the balancing resistance 21. The outer side of the resistance 22 is connected by a conductor 143 leading through a fixed resistance 144 to a rectifier network 145 connected by a conductor 146 to the eighth terminal of the switch portion B and connected by a conductor 147 to the eighth terminal of the switch portion C. When the gang switch is in this position, the bridge voltage across the bridge applied by the transformer 80 may be measured.

As was previously described, the three gang switch including the switch arms 35, 36 and 37 is movable between the central operating position illustrated in the drawings to a left hand position where the switch arms are connected with terminals 44, 63 and 55 and a right hand position in which the switch arms are in connection with the terminals 43, 61 and 62. In the left hand position mentioned the apparatus is in position to measure the temperature of the fluid and to calibrate the instrument and probe to compensate for variations in temperature and in the right hand position mentioned the instrument may be adjusted to provide a reference reading for calibration for variations in flow. When the three gang switch is turned to the left hand position, the direct connection between the probe resistance 13 and the balancing resistance 21 is broken, this connection having been established through the switch arms 36 and 35 when the switch was in the central position shown, as was previously described. In this left hand position of the three-gang switch the conductor 40 from one side of the resistance 13 is connected through the conductor 41, the switch arm 36, terminal 63, conductor 64, and conductor 60 to the conductor 32 connected to the opposite side of the resistance coil 13. Thus, this resistance coil 13 is short circuited. At the same time, the resistance 66 remains shorted through the switch arm 35. The resistor 69 and variable resistor 70 are in shunt relation with the resistor 67 and the circuit may be balanced for variations in temperature while the probe resistance coil 13 is shorted out of the circuit.

With the switch 34 turned to its right hand position, the instrument may be adjusted to provide a reference point for variations in flow. In this position, the conductor 32 leading to one side of the probe resistance coil 14 is connected through conductor 60, terminal 62, switch arm 37, conductor 53, and conductor 52 to the other side of the coil 14 thus shorting out this coil from the circuit.

At the same time the resistance coil 13 is also shorted out through the switch arm 36. This circuit extends from the conductor 40 connected to one end of the probe resistance coil 13 through conductor 41, the switch arm 36, terminal 61, and conductor 60 to the conductor 32 leading to the opposite terminal of the coil 13. Thus, when the switch 34 is in the right hand position mentioned, both of the coils 13 and 14 are shorted out.

When the switch is in this position, the resistance 92 is connected between opposite sides of the balance resistors 21 and 22. The conductor 52 is connected through the resistance 92, conductor 57, bridge balance resistances 22 and 21, conductor 47, resistance 66, conductor 65, switch arm 35, terminal 43, and conductor 42 to line wire 40. As the coils 13 and 14 are shorted out in this position of the switch 34, the resistances 66 and 92 temporarily form the remaining resistance of the Wheatstone bridge circuit. The circuit may be balanced by means of the variable resistor 94 which, with fixed resistor 93, is in shunt relation with resistor 92.

Thus, a circuit is provided which may be accurately balanced to measure temperatures and flow variations. The temperature measurement is accomplished by shorting out one probe resistance coil and providing a balance through the resistor 67 and the resistors 69 and 70 in shunt relation thereto. The flow calibration is accomplished by shorting out both probe resistors and balancing resistor 66 with resistor 92 and resistors 93 and 94 in shunt relation thereto.

In normal practice the sensor resistance coils 13 and 14 are uninsulated and the coils are slightly spaced. A silicone coating may, if desired, be applied to the probe as a protective measure.

FIGURE 3 of the drawings indicates very diagrammatically the original test apparatus used to try out the principle. At this point the theory of the invention had not been tried out and the apparatus illustrated was set up to determine whether or not the device was operable. A tank of liquid 150 was used as a reservoir and a pump 151 was connected to the tank by a conduit 152. The discharge of the pump 151 was connected by a conduit 153 to a flow meter 154 which in turn was connected by a conduit 155 to the reservoir 150. A T-shaped connection 156 was provided in the connection 155 and the probe or sensor A extended through this T connection 156 and into the conduit 155. The sensor was connected to an apparatus of the general type illustrated in FIGURE 4 to provide a flow measurement. With this apparatus it was found that the flow past the sensor could be indicated by operation of a stylus and variations in the flow from the pump as indicated by the flow meter 154 could also be graphically shown by the stylus.

As a result of these experiments which indicated the operability of the system, work has continued measuring flow of blood in a blood stream.

In the operation of the apparatus, the bridge voltage supply is connected across the bridge as indicated and the output of the system is connected through the amplifier to the stylus or other indicating device. Preferably, the bridge voltage supply is generated by an oscillator tube and a frequency of 2400 cycles a second has been usually used. The maximum signal output is usually several millivolts when the device is used in the blood stream and the temperature differences of the resistance sensors has been estimated at ¼° F. for the maximum signal recorded.

In the event the resistance coils 13 and 14 are not in perfect balance when constructed, they may be placed in balance by the use of the variable resistor 91 with the switch arm 85 connected to a suitable terminal 86 or 89. The three gang switch 34 is moved to the left hand position to measure variations in temperature and turned to the right hand position to calibrate variations in flow. The various resistances as well as the heater current and voltage and the bridge voltage may be measured by the meter 117, rotating the four gang switches B, C, D and E to the various positions described. When the sensor is in position and the heater current is applied, the Wheatstone bride circuit provides an output signal which is transmitted to the amplifier and directed to the stylus for indication.

It will be noted that in the bridge circuit, the use of make and break switches has been avoided to eliminate contact resistance. It should also be noted that by using an alternating current oscillator as the bridge voltage supply, thermal E.M.F. is avoided at the junction sites since the current does not pass the D.C. amplifier.

In accordance with the patent statutes, I have described the principles of construction and operation of my improvement in fluid flow meters, and while I have endeavored to set forth the best embodiment thereof, I desire to have it understood that changes may be made within the scope of the following claims without departing from the spirit of my invention.

I claim:

1. An apparatus for measuring the flow of blood in the human body including a catheter tube, a sensor mounted on the end of said tube, said sensor having a closed extremity, said sensor including electrical means on the outer periphery thereof for measuring fluid flow adapted to be supported in the path of flow of the blood, conductors connected to said sensor and extending through said catheter tube, and indicator means connected to said conductors for indicating variations in fluid flow as well as fluid volume.

2. An apparatus for measuring the flow of blood in the human body including a catheter tube, a sensor mounted on an end of said tube, said sensor including a tubular body having a closed extremity and having a pair of temperature sensitive electrical resistance coils wound about the outer periphery of said tubular body in longitudinally spaced relation, an electrically operated heating coil wound about said tubular body between said resistance coils, said coils being in the path of blood movable past said sensor when in use, means for supplying current to said heating coil to heat the same, means for measuring the temperature of each said resistance coil, and conductors extending from said coils through said tubular body and said catheter tube to said measuring means.

3. An apparatus for measuring the flow of blood in the human body including a catheter tube, an elongated sensor having a closed tapered extremity mounted on the end of said tube, said sensor including a pair of spaced temperature sensitive elements in longitudinally spaced relation on said sensor on the exterior surface of the sensor and in the path of flowing blood when the sensor is in use, a heating element on said sensor intermediate said temperature sensitive elements, and conductors leading from said elements through said catheter tube.

4. An apparatus for measuring the flow of blood in the human body including an elongated support capable of being inserted into the blood stream, a pair of spaced resistance elements on the exterior surface of said support and in the path of the flowing blood when the apparatus is in use, an electric heating element on said support midway between said resistance elements, conductors extending from said elements, said resistance elements being connected as two legs of a Wheatstone bridge circuit, balancing resistors connected to said resistance elements as the remaining legs of the Wheatstone bridge circuit, means applying a bridge voltage across said bridge circuit, an output signal from said bridge circuit indicating variations in temperature in said resistance elements, and means for indicating said signal.

5. The structure of claim 4 and in which said indicating means includes a signal amplifying means, and a recording device connected to said amplifying means to record said signal.

References Cited in the file of this patent

UNITED STATES PATENTS

| | | |
|---|---|---|
| 2,586,060 | Kronberger | Feb. 19, 1952 |
| 2,634,721 | Greenwood | Apr. 14, 1953 |
| 2,728,337 | Guillemin | Dec. 27, 1955 |
| 2,729,976 | Laub | Jan. 10, 1956 |
| 2,832,018 | Laub | Apr. 22, 1958 |
| 2,892,347 | Laprand | June 30, 1959 |
| 2,916,914 | Graves et al. | Dec. 15, 1959 |